US010049376B1

(12) United States Patent
Joglekar et al.

(10) Patent No.: US 10,049,376 B1
(45) Date of Patent: Aug. 14, 2018

(54) SYSTEM AND METHOD FOR PAYMENT WITH REWARDS CURRENCY AT THE POINT OF SALE

(71) Applicant: JPMorgan Chase Bank, N.A., New York, NY (US)

(72) Inventors: Ajinkya P. Joglekar, Philadelphia, PA (US); Manning R. Field, Media, PA (US); Neil I. Seideman, Bala Cynwyd, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 451 days.

(21) Appl. No.: 14/505,044

(22) Filed: Oct. 2, 2014

(51) Int. Cl.
*G06Q 30/00* (2012.01)
*G06Q 30/02* (2012.01)

(52) U.S. Cl.
CPC ..... *G06Q 30/0238* (2013.01); *G06Q 30/0215* (2013.01)

(58) Field of Classification Search
CPC .................................................. G06Q 30/0233
USPC ......................................................... 705/14
See application file for complete search history.

(56) References Cited

U.S. PATENT DOCUMENTS

| | | |
|---|---|---|
| 8,046,256 B2 | 10/2011 | Chien et al. |
| 8,600,883 B2 | 12/2013 | Wong |
| 8,615,428 B2 | 12/2013 | Postrel |
| 8,682,791 B2 | 3/2014 | Bies et al. |
| 8,700,457 B2 | 4/2014 | Craft |
| 8,838,477 B2 | 9/2014 | Moshfeghi |
| 8,844,812 B1 | 9/2014 | Rivera et al. |
| 8,862,513 B2 | 10/2014 | Wong |
| 9,269,083 B1* | 2/2016 | Jarajapu ............... G06Q 20/105 |
| 2003/0182191 A1 | 9/2003 | Oliver et al. |
| 2003/0216960 A1 | 11/2003 | Postrel |
| 2007/0078719 A1 | 4/2007 | Schmitt et al. |
| 2008/0103968 A1 | 5/2008 | Bies et al. |
| 2008/0133350 A1 | 6/2008 | White et al. |
| 2008/0255942 A1* | 10/2008 | Craft .................... G06Q 20/045 |
| | | 705/14.26 |

(Continued)

OTHER PUBLICATIONS

U.S. Appl. No. 12/907,109, filed Oct. 2010, Fillmore et al.

(Continued)

*Primary Examiner* — Matthew L Hamilton
(74) *Attorney, Agent, or Firm* — Hunton Andrews Kurth LLP

(57) ABSTRACT

The invention relates to a computer-implemented system and method for enabling the use of rewards cash or points with a mobile device at a merchant's point of sale device, according to one example. The method may comprise the steps of: acquiring information about the location of a mobile device of an account holder; sending information to the mobile device identifying one or more nearby merchants at which the account holder is able to make a payment with the mobile device using a rewards currency associated with an account of the account holder; sending to the mobile device an available rewards currency amount that can be applied to a purchase; receiving a selected rewards currency amount that the account holder elects to apply to the purchase; and initiating a generation of an electronic payment signal by the mobile device for the total purchase amount.

18 Claims, 12 Drawing Sheets

(56) References Cited

U.S. PATENT DOCUMENTS

| | | | |
|---|---|---|---|
| 2010/0057580 A1* | 3/2010 | Raghunathan | G06Q 20/04 705/17 |
| 2010/0131347 A1 | 5/2010 | Sartipi | |
| 2010/0299194 A1* | 11/2010 | Snyder | G06Q 20/10 705/14.13 |
| 2011/0173061 A1 | 7/2011 | Anulewicz et al. | |
| 2012/0010931 A1 | 1/2012 | Mehra et al. | |
| 2012/0059736 A1* | 3/2012 | Bhattacharya | G06Q 20/02 705/26.41 |
| 2012/0239474 A1* | 9/2012 | Healy | G06Q 40/02 705/14.17 |
| 2012/0296720 A1 | 11/2012 | Pirillo | |
| 2012/0323765 A1* | 12/2012 | Spaulding | G06Q 20/35785 705/39 |
| 2013/0018778 A1* | 1/2013 | Bohanan | G06Q 40/02 705/39 |
| 2013/0097034 A1 | 4/2013 | Royyuru et al. | |
| 2013/0304559 A1* | 11/2013 | Stone | G06Q 20/06 705/14.33 |
| 2014/0025518 A1* | 1/2014 | Look | G06Q 20/347 705/21 |
| 2014/0074704 A1 | 3/2014 | White et al. | |
| 2014/0101044 A1* | 4/2014 | Blackhurst | G06Q 20/385 705/44 |
| 2014/0122327 A1* | 5/2014 | Aleles | G06Q 20/342 705/39 |
| 2014/0197235 A1 | 7/2014 | Shisgal | |
| 2015/0006271 A1* | 1/2015 | Oppenheim | G06Q 30/06 705/14.23 |
| 2015/0088753 A1* | 3/2015 | Van Der Schueren | G06Q 20/351 705/67 |
| 2015/0154587 A1* | 6/2015 | Chetty | G06Q 20/342 705/16 |
| 2015/0161585 A1* | 6/2015 | Huster | G06Q 20/3224 705/44 |
| 2015/0178721 A1* | 6/2015 | Pandiarajan | G06Q 20/382 705/75 |
| 2015/0248669 A1* | 9/2015 | Kornman | G06Q 20/342 705/41 |
| 2015/0317663 A1* | 11/2015 | Chinoy | G06Q 30/0238 705/14.26 |
| 2016/0055513 A1* | 2/2016 | Kuhn | G06Q 30/0222 705/14.23 |
| 2016/0132876 A1* | 5/2016 | Petersen | G06Q 20/36 705/44 |
| 2016/0210605 A1* | 7/2016 | Vaish | G06Q 20/12 |
| 2017/0132653 A1* | 5/2017 | Venugopalan | G06Q 30/0238 |

OTHER PUBLICATIONS

U.S. Appl. No. 12/907,115, filed Oct. 2010, Fillmore et al.
U.S. Appl. No. 13/616,625, filed Sep. 2012, Fillmore et al.
CashStar Readies a Mobile App That Taps Bank Rewards Points for Retail Gift Cards. Digital Transactions: Trends in the Electronic Exchange of Value [serialonline], Oct. 3, 2011 [retrieved on Feb. 5, 2015]. Retrieved from the Internet <URL: http://digitaltransactions.net/news/story/CashStar-Readies-a-Mobile-App-That-Taps-Bank-Rewards-Points-for-Retail-Gift-Cards>.
Points Meet Point of Sale: Membership Rewards® from American Express Debuts Mobile Gift Cards. American Express: Press Release [online], Nov. 13, 2012 [retrieved on Feb. 5, 2015]. Retrieved from the Internet <URL: https://web.archive.org/web/20121127233029/http://about.americanexpress.com/news/pr/2012/mobile-gift-card.aspx>.
Lee, Singyin. Reward Your Customers: 9 Loyalty Platforms for Booming Businesses. hongkiat.com [online], Jan. 1, 2014 [retrieved on Feb. 5, 2015]. Retrieved from the Internet <URL: https://web.archive.org/web/20140101022033/http://www.hongkiat.com/blog/mobile-loyalty-platforms/>.

* cited by examiner

SYSTEM AND METHOD FOR PAYMENT WITH REWARDS CURRENCY AT THE POINT OF SALE

FIELD OF THE INVENTION

The invention relates generally to a system and method for use of rewards currency, and more particularly to a system and method for facilitating the redemption of rewards cash or points at a merchant's point of sale device.

BACKGROUND

Various efforts have been made to devise a system that enables a consumer to easily pay with his or her mobile device at a point of sale (POS) terminal. ISIS and PayPal, for example, have introduced such systems. However, these systems have not yet been widely implemented, and they also do not enable the user to redeem rewards cash or points for payment.

In many cases, account holders do not perceive their rewards program to be particularly useful or valuable primarily because they do not know how to redeem the points or cash value. If an account holder must find and then learn the process and rules for redeeming rewards points, often he or she will not make the effort. Consequently, the account holder does not actually use his or her rewards points, and the issuing bank does not gain the benefit that the rewards program was intended to provide, i.e., increased customer loyalty.

It would be desirable, therefore, to have a system and method that facilitated the use of an account holder's rewards currency, and that also enabled the account holder to use their mobile device to make a payment using their rewards currency.

SUMMARY

According to one embodiment, the invention relates to a computer-implemented system and method for enabling the use of rewards currency with a mobile device at a merchant's point of sale device. The method may be conducted on a specially programmed computer system comprising one or more computer processors, mobile devices, electronic storage devices, and networks. The method may comprise the steps of: acquiring information about the location of a mobile device of an account holder; sending information to the mobile device identifying one or more nearby merchants at which the account holder is able to make a payment with the mobile device using a rewards currency associated with an account of the account holder; authenticating the account holder with the mobile device; sending to the mobile device, before the account holder initiates a transactions at one of the nearby merchants, an available rewards currency amount that can be applied to a purchase; receiving a total purchase amount for a purchase at a merchant; receiving a selected rewards currency amount that the account holder elects to apply to the purchase; if the total purchase amount is greater than the selected rewards currency amount, receiving confirmation from the account holder to use the account of the account holder to pay for the difference between the total purchase amount and the selected rewards currency amount; initiating a generation of an electronic payment signal by the mobile device for the total purchase amount; reducing the account holder's available rewards currency amount by the selected rewards currency amount that the account holder elected to apply to the purchase; and updating a balance of the account holder's account by the difference between the total purchase amount and the selected rewards currency amount.

The invention also relates to a computer implemented system for enabling the use of rewards currency at a merchant's point of sale device using a mobile device, and to a computer readable medium containing program instructions for executing a method enabling the use of rewards currency at a merchant's point of sale device using a mobile device.

The computer implemented system, method and medium described herein can provide the advantage of allowing the account holder to easily complete a payment transaction using their rewards currency on their mobile device, with or without an additional charge to their account, according to various embodiment of the invention. Another advantage that can be provided is increased loyalty due to the increased satisfaction of the account holder. The system not only can make it very easy for the account holder to see his or her available rewards cash or points, but also proactively informs the account holder of opportunities to use it, and makes the payment process very simple. That type of experience may enhance loyalty to the financial institution much more than a convention rewards program that takes significantly more effort to understand and redeem the rewards currency. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
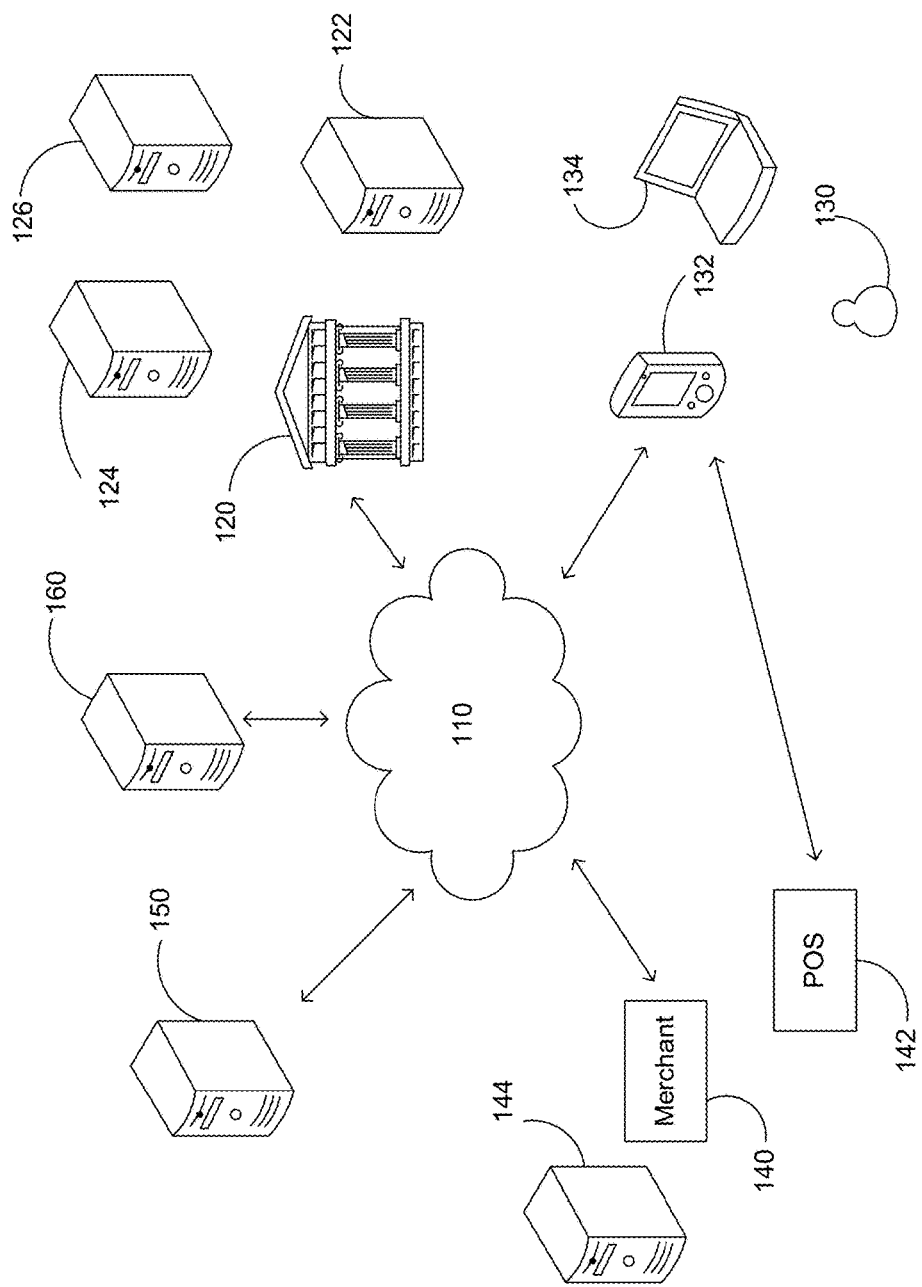
FIG. 1 is a drawing of a system for enabling use of rewards currency at a merchant's point of sale device through a mobile device, according to one embodiment of the invention.

FIG. 1 is a diagram of a payment system for enabling an account holder to use his or her rewards currency (e.g., rewards cash or points) to make a purchase at a point of sale (POS) device with his or her mobile device according to one embodiment of the invention. As shown in FIG. 1, the payment system may include one or more computer servers and networks. The payment system may be provided by a financial institution 120 such as retail bank, according to one embodiment of the invention. The payment system may be embodied primarily or entirely in a payment server 122 (which may include a database) owned and/or operated by the financial institution that interfaces with a number of other servers and entities via one or more networks.

The payment server 122 that enables the account holder 130 to pay with rewards currency at the merchant's POS device 142 can interface with other servers owned and/or operated by the financial institution 120. For example the payment server 122 may interface with a credit card server and associated database 124 that stores and processes credit card transactions for credit card holders of the financial institution 120. The payment server 122 may also interface with a rewards program server and associated database 126 that stores and processes rewards information for account holders at the financial institution 120. The foregoing description is merely one example of a configuration for such functions and is not intended to be limiting.

Also shown in FIG. 1 is an account holder 130 of the financial institution who may communicate electronically with the financial institution 120 using a mobile device 132 and optionally a personal computing device 134. The mobile device 132 may be a smart phone, such as an Apple iPhone, Samsung Galaxy, or Amazon Fire Phone, that includes a touch screen or other interactive display. The display can be used to present a bar code, QR code or other code to the POS device 142 of the merchant 140. The mobile device 132 and the merchant's POS device 142 may also include other hardware and software enabling them to communicate using other communication channels, such as a near field communication (NFC) signals or a Bluetooth signals. The mobile device 132 also typically includes hardware and software to enable communication with a cellular network and WiFi network. The personal computing device 134 may comprise a laptop computer, tablet computer, or desktop computer, for example. The account holder 130 may use the personal computing device 134 to execute various online banking transactions with the financial institution 120 at home.

The payment system 122 enables the account holder 130 to make a payment using his or her mobile device 132 at a POS device 142 of a merchant 140. The POS device 142 may comprise hardware and software that can read a bar code, QR code, magnetic strip, NFC transmission, Bluetooth signal, or other communication transmitted or presented by the account holder. The POS device 142 is typically installed at the merchant's checkout counter and is linked to a merchant server 144 that executes payment transactions.

According to one embodiment of the invention, the payment is made by the account holder 130 in the form of an electronic gift card that is displayed on the display of the account holder's mobile device 132. The electronic gift card is generated by an electronic gift card server 150. The electronic gift card server 150 may be owned and/or operated by the financial institution 120 or by a third party payment processing entity such as a gift card company on behalf of the financial institution 120. The electronic gift card presented by the account holder's mobile device 132 to the merchant contains sufficient information to allow the merchant server 144 to request authorization from the electronic gift card server 150 for the amount of the electronic gift card. For example, the electronic gift card may include a gift card number and one or more other reference numbers that are used to identify the electronic gift card, its amount, and the channels in which it can be used, e.g., online, in store, and/or by phone. Such information can also be used by the merchant to obtain settlement with the electronic gift card provider, e.g., request and receive payment from the electronic gift card provider for the amount of the redeemed electronic gift card.

According to other embodiments of the invention, the payment can be tendered by the account holder with his or her mobile device 132 in other forms. FIG. 1 shows a payment server 160 that may be operated by a third party payment processor or by an affiliate or a division of the financial institution 120. The payment server 160 can define and initiate the generation of an electronic payment signal or "digital tender" that participating merchants have agreed to accept, similar to an electronic gift card. When the account holder 130 decides to use his or her rewards currency in a transaction, the financial institution 120 initiates the generation of a payment signal through the payment server 160 that is operated by or on behalf of the financial institution. The payment signal is sent by the payment server 160 to the account holder's mobile device 132 and it instructs the mobile device 132 to generate a signal or "digital tender" that is transmitted to the merchant's POS device 142, such as a bar code, QR code, NFC signal, or Bluetooth signal. The signal transmitted by the mobile device 132 includes sufficient information (e.g., serial number, amount, and information on authorized channels) to enable the merchant to request authorization for the transaction and to settle the transaction with the payment processor through the payment server 160.

Referring again to FIG. 1, the network 110 enables communications between various computing devices and storage devices in the system. The network 110 may comprise one or more of the Internet, a wide area network (WAN), a local area network (LAN), and/or an intranet, according to various embodiments of the invention. The network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

Various embodiments of the invention may also utilize an established payment network such as the VISA network, MasterCard network, NYCE network, or other similar network to transmit information between various entities using the system. For example, the payment server 150 or 160 may use the VISA network for authorization and settlement of transactions. However, use of such established credit and debit networks is not required according to various embodiments of the invention. The payment servers 150 and/or 160 can be configured to use other networks for executing payment transactions and transmitting information to the cardholders, merchants, and financial institutions. Payments can be made by rendering such other payment network's digital tender on the mobile device 132 and presenting it at the merchant's POS device 142.

An example of the process for enabling an account holder to make a mobile payment using rewards currency (in this example, cash value) at a merchant's point of sale device will now be described.

Figure 2:
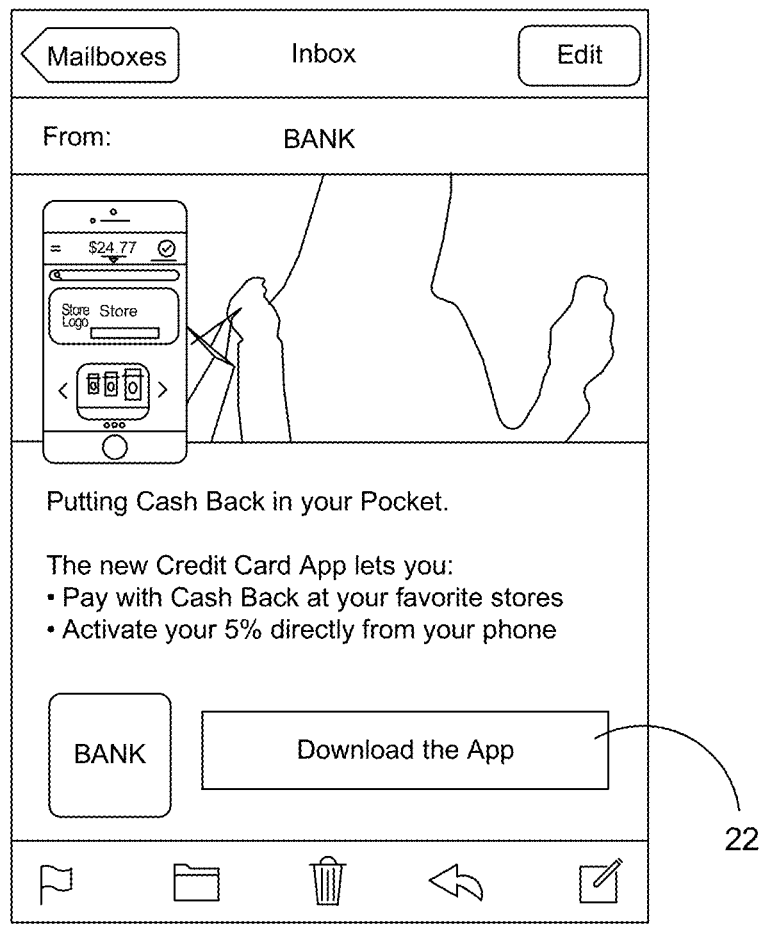
FIG. 2 illustrates an example of an initial message sent to an account holder's mobile device inviting the account holder to register to use their rewards currency at participating merchants using their mobile device.

Initially, the financial institution 120 may send a message to a desired group of its account holders introducing them to the option of paying with rewards currency, such as rewards cash or points, from their mobile device 132. The defined group of account holders may be, for example, all holders of a certain type of credit card at the financial institution, such as CHASE FREEDOM card holders according to one example. FIG. 2 illustrates an example of such an introductory message. As shown in FIG. 2, the message informs the account holder 130 that they have the potential to use their rewards cash at certain stores and that they can activate a cash value rewards program directly from their mobile device 132. The message includes a button 22 enabling the account holder to download a software application (also referred to herein as an "app") onto their mobile device 132.

Figure 3:
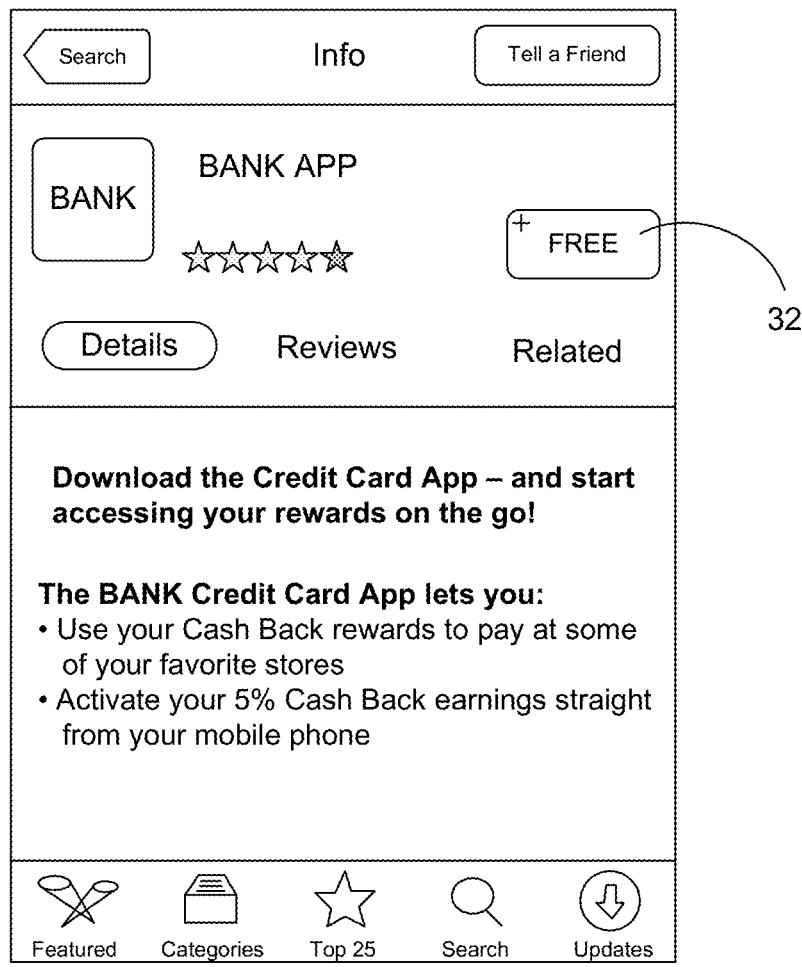
FIG. 3 illustrates an example of a screen presented on the account holder's mobile device for downloading an app that allows them to use their mobile device to pay with rewards currency at participating merchants.

If the account holder taps the "Download the App" button 22, they are linked to an app store or other site that allows them to download the app onto their mobile device 132. As shown in FIG. 3, the account holder can download the app by tapping the "FREE" button 32. The app store screen in FIG. 3 reiterates that the account holder can use their rewards cash to pay at some of their favorite stores and to activate a cash value rewards program using their mobile device 132.

Once the app has been downloaded, the account holder can open it by tapping on the icon representing the app on their mobile device. The app then opens on the account holder's mobile device 132 and executes an initial log on setup process according to one embodiment of the invention. In the initial log on setup process, the app presents a number of questions on the account holder's mobile device 132. For example, the app may indicate that it would like to send push notifications to the account holder and may explain that these push notifications may include alerts, sounds and icon badges that can be configured in the "Settings" portion of the account holder's mobile device 132. The app may present the account holder with a button labeled "Don't Allow" and a button labeled "OK." The account holder can then tap the appropriate button to indicate whether he or she would like to receive push notifications.

The app may also ask the account holder whether it is permissible to know the account holder's current location and present a "Don't Allow" button and an "OK" button. The account holder can then tap the appropriate button to specify whether it is permissible for the app to track his or her current location.

The app may then offer to take the account holder through a guided tour of the payment process by presenting a number of screens illustrating the process. For example, the app may present a first screen depicting a user selecting a store where the user would like to pay with rewards cash by tapping on an icon. The app may then present a second screen depicting the user entering the amount of rewards cash that he or she would like to use for the purchase. This screen may also explain that any extra balance will be put onto the user's credit card account automatically through the app. The app may then present a third screen depicting the mobile device displaying a bar code and explaining that the user simply presents the bar code at the checkout counter to achieve the payment using the selected amount of their rewards cash.

The initial log on setup process may also present the account holder with a user log on screen. The log on screen may include fields enabling the account holder to log on by entering his or her user ID and password, which can be the user ID and password that the account holder has previously established with the financial institution, or a separately created user ID and password. The account holder's user ID and password enable the financial institution to authenticate the account holder.

The initial log on setup process may also include the presentation of a screen recommending that the account holder turn on his or her alerts in the "Settings" portion of his or her mobile device 132. The screen may explain that turning on these alerts makes it easy to find nearby stores where the account holder can pay with rewards cash, and receive cash value activation alerts when it is time to activate the cash value function of the rewards program.

After the user has completed the initial log on setup process, the app may present a home screen that assists the user in identifying opportunities to use his or her rewards cash to make payments at participating merchants. Initially, the app may present an overlay on the home page the first time the user accesses the home page. The home page overlay presents the user with helpful instructions as to how to access different features of the app. For example, the home page overlay may present an icon at the top of the screen advising the user to pull down on the icon to see cash value status; arrows on the right and left portions of the screen and text advising the user to swipe left and right to see places nearby; and an icon at the bottom of the screen advising the user to pull up on the icon to explore his or her favorite merchants.

Figure 4:
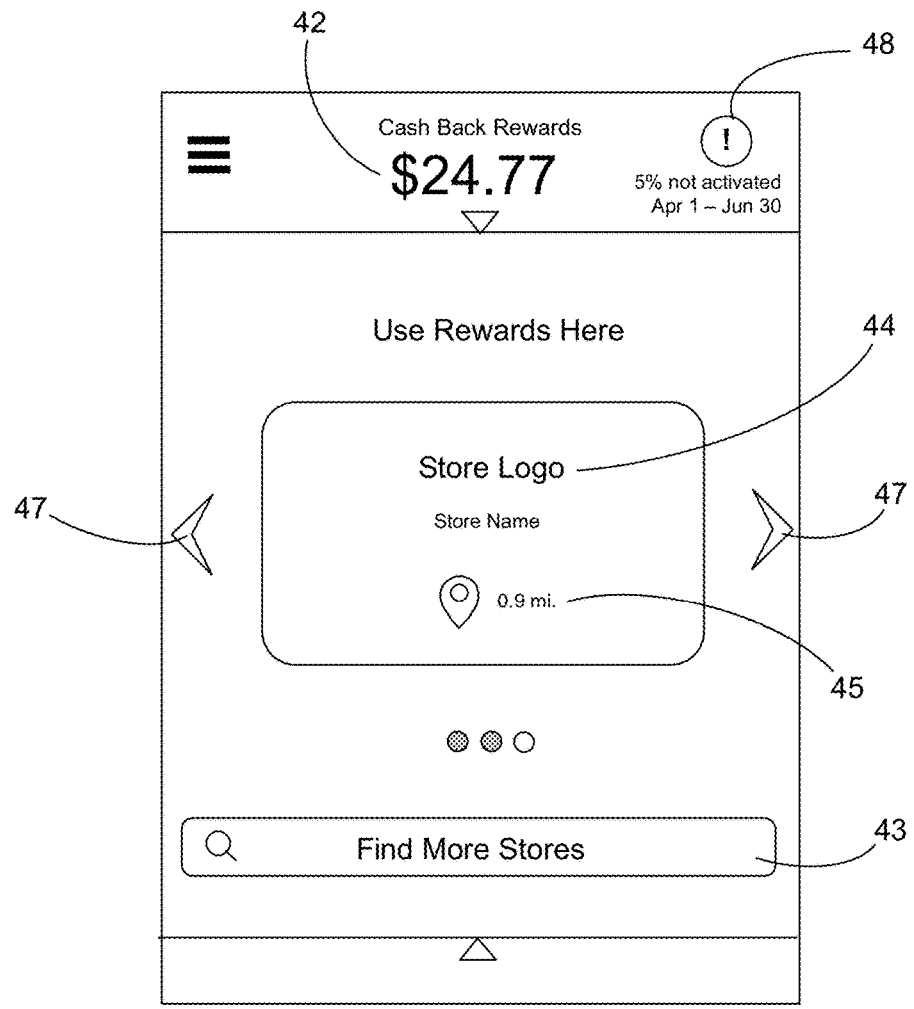
FIG. 4 is an example of a home screen for an app that identifies available rewards currency and nearby participating merchants.

FIG. 4 illustrates one example of a home screen that may be presented after the account holder reviews the overlay. As shown in FIG. 4, the home screen provides useful information on available rewards cash and nearby merchants. In this example, the home screen presents: the amount of rewards cash 42 available to be used for a payment, a search field 43 for entering search text to locate a participating merchant, an icon of the nearest participating merchant 44, and the current distance 45 of that merchant from the account holder's mobile device 132. The arrows 47 can be used to identify additional merchants beyond the one that is shown in FIG. 4. That is, if the account holder taps the arrow 47, the app will display another nearby participating merchant. A merchant can participate in the system by reaching agreement with the financial institution 120 or the gift card provider or other payment processing entity to configure its POS device 142 to accept electronic gift cards or other forms of digital payment tender that are generated by the electronic gift card server 150 or by the payment server 160, transmitted to the account holder's mobile device 132, and presented by the account holder to the participating merchant's POS device 142 to make a purchase.

Figure 5:
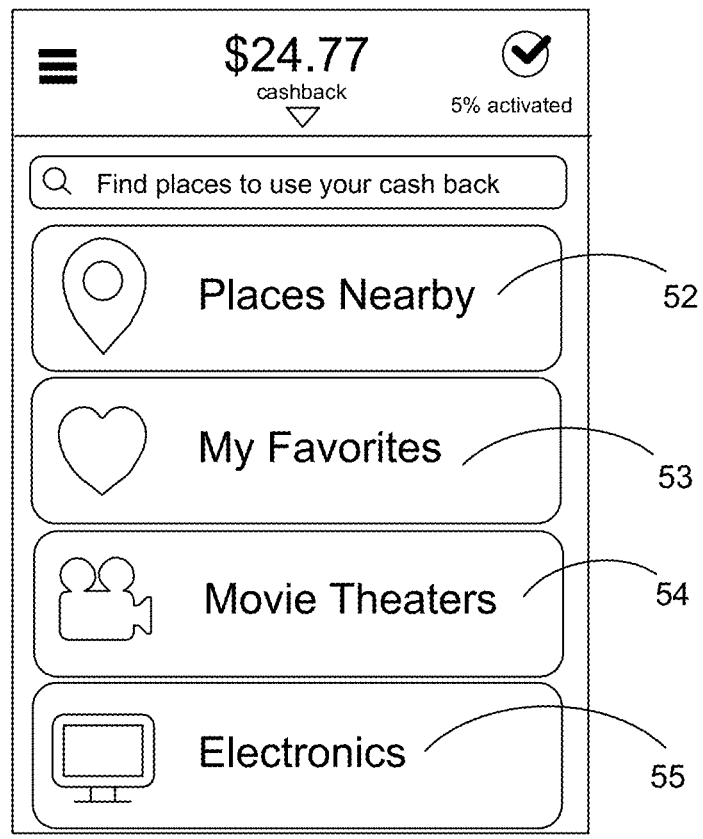
FIG. 5 is an example of a search screen that assists an account holder with identifying merchants that will accept payment using the account holder's rewards currency.

The app on the account holder's mobile device 132 may also provide functionality to allow the account holder to search for participating merchants according to various categories. FIG. 5 illustrates an example of a category search screen that the account holder can access by tapping a button on the home screen. As shown in FIG. 5, the category search may allow the account holder to search by Places Nearby 52, My Favorites 53, Movie Theaters 54, and Electronics 55, for example. Other categories may be included as desired, for example Coffee Shops, Department Stores, Grocery Stores, Home Improvement, and Recently Redeemed.

Thus, the home screen provides access to a number of functions that enable the account holder to see the value of their rewards cash, as well as to easily identify participating merchants at which they can use their rewards cash.

Figure 6:
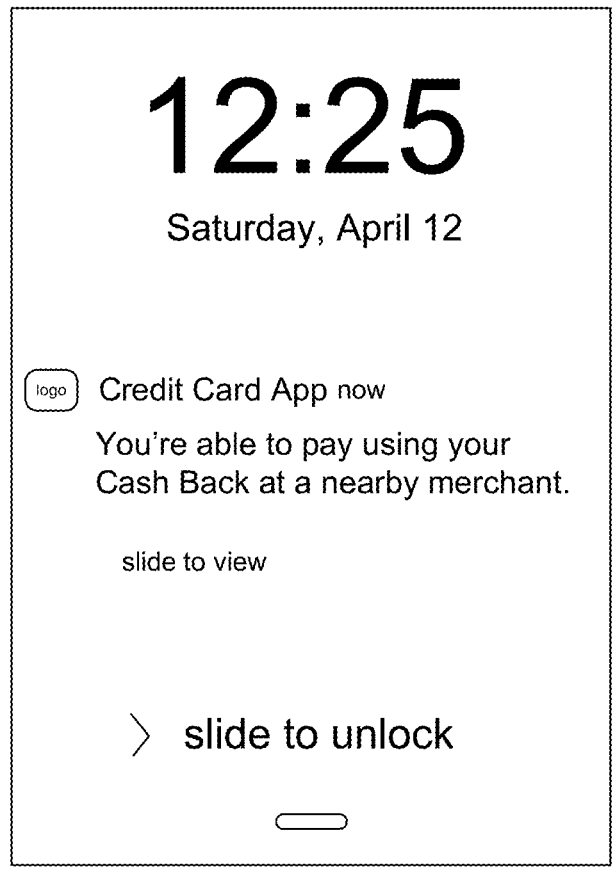
FIG. 6 is an example of an alert sent to an account holder's mobile device informing the account holder that there are nearby merchants that will accept payment using the account holder's rewards currency.
Figure 7:
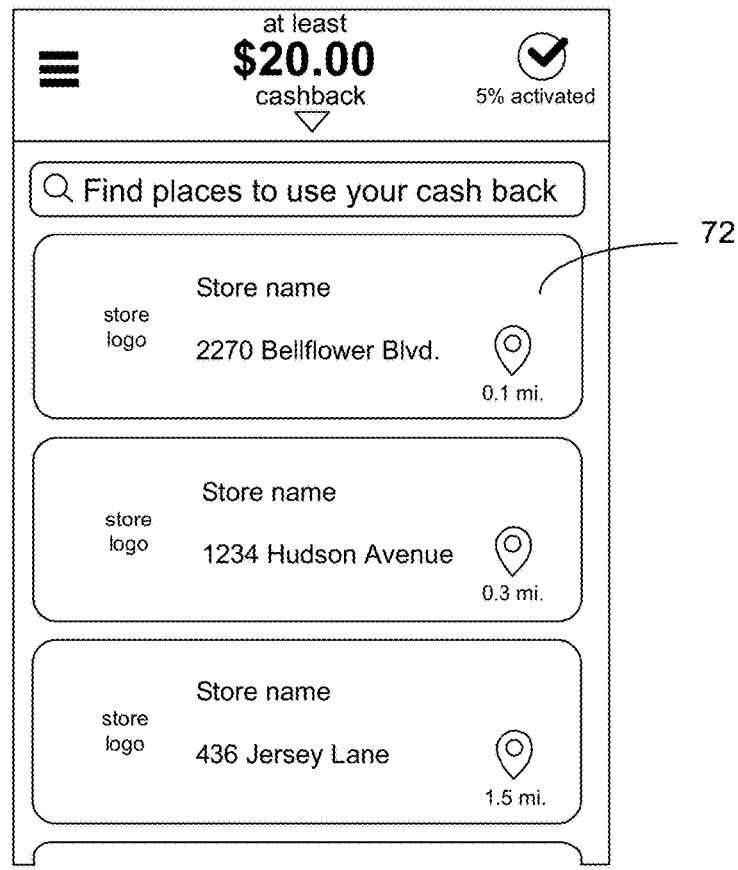
FIG. 7 is an example of a screen that identifies a number of nearby participating merchants.

Aside from the search functions described above that can be initiated by the account holder, the app may also send push notifications to the account holder based on his or her location. If the account holder has allowed his or her location to be tracked and has enabled alerts, then the app will present push notifications when the account holder is in proximity of one or more participating merchants. Initially, the app may present a message informing the account holder that they are able to pay using their rewards cash at a nearby merchant, as shown in FIG. 6. If the account holder responds to that message by opening the app, a screen may be presented that shows the nearby merchants and their distance. FIG. 7 shows an example of such a screen, illustrating that Target is 0.1 miles away, Foot Locker is 0.3 miles away, and Lowe's is 1.5 miles away. According to other embodiments of the invention, the app may present a screen allowing the user to swipe left or right or to tap an icon to identify a list of additional nearby merchants. The list of nearby merchants presented by the app may include a name and address of the merchant, a logo of the merchant, and a distance between the user's current location and the merchant location.

According to other embodiments of the invention, the app can provide additional functionality to find participating merchants at which the user can use their rewards currency to make a purchase, and/or special offers. For example, the app may present a virtual wheel (e.g., like a roulette wheel with merchants and offers at various positions on the wheel) that the user can spin to browse personalized offers from merchants and customize the wheel. The wheel may allow the user to add merchants to his or her list of favorites and to receive personalized offers, such as time-based offers (save 20% at Starbucks after 3 pm), offers based on recent spending by the user with the card, special offers (save 20% at Nordstrom on summer wardrobe items), and listing existing favorite merchants.

Figure 8:
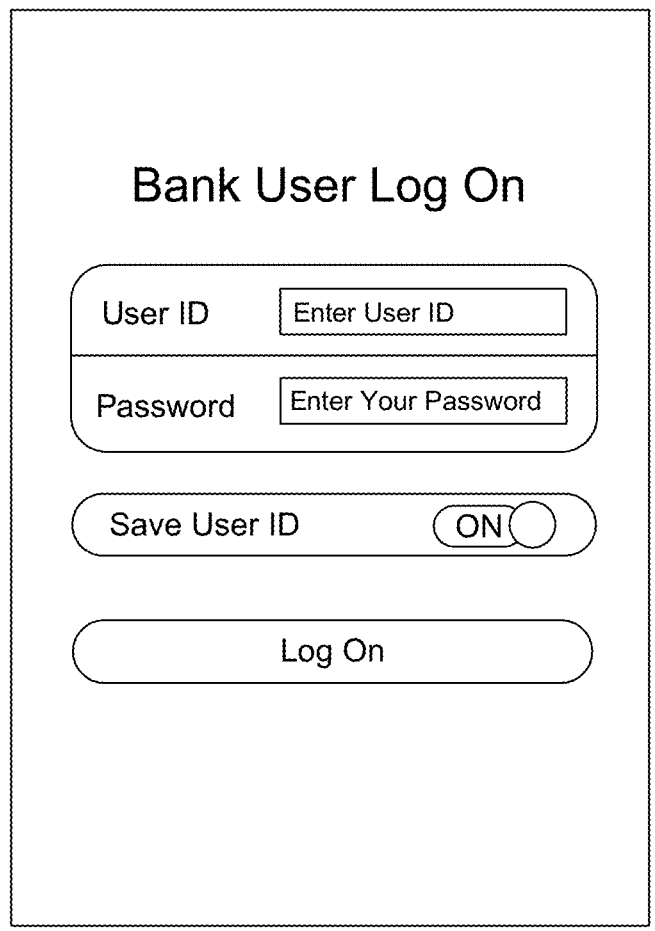
FIG. 8 is an example of a log on screen used to authenticate an account holder.

If the account holder decides to use their rewards currency to make a purchase at a merchant, e.g., Target, they tap the merchant's icon. The app may then prompt the account holder to log on to the app by presenting the account holder with a log on screen, as shown in FIG. 8. The account holder can log on by entering his or her user ID and password. The system uses the user ID and password to authenticate the account holder.

Figure 9:
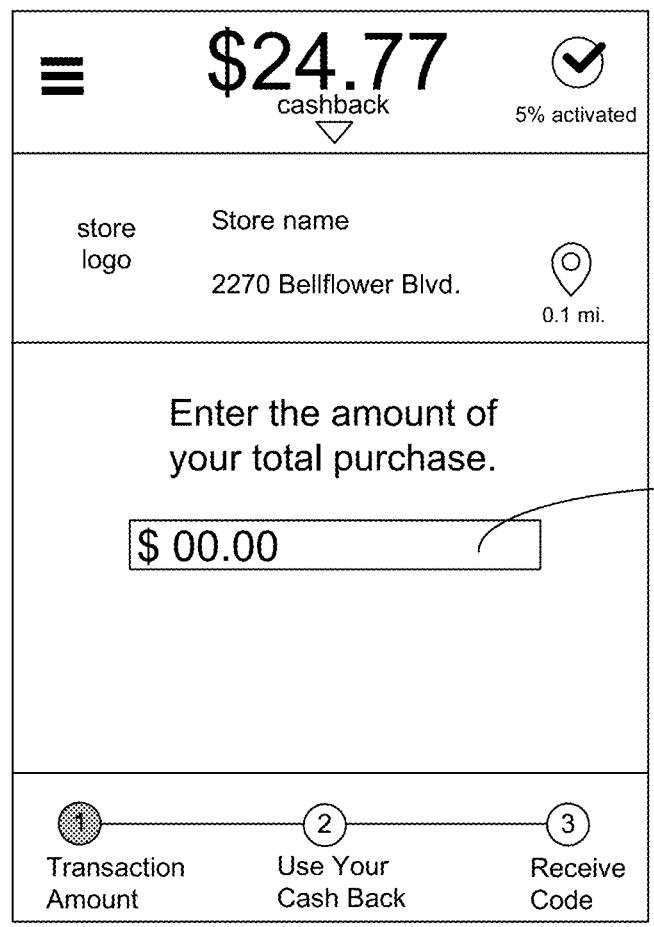
FIGS. 9 and 10 are examples of screens allowing an account holder to enter a total amount of a purchase.
Figure 10:
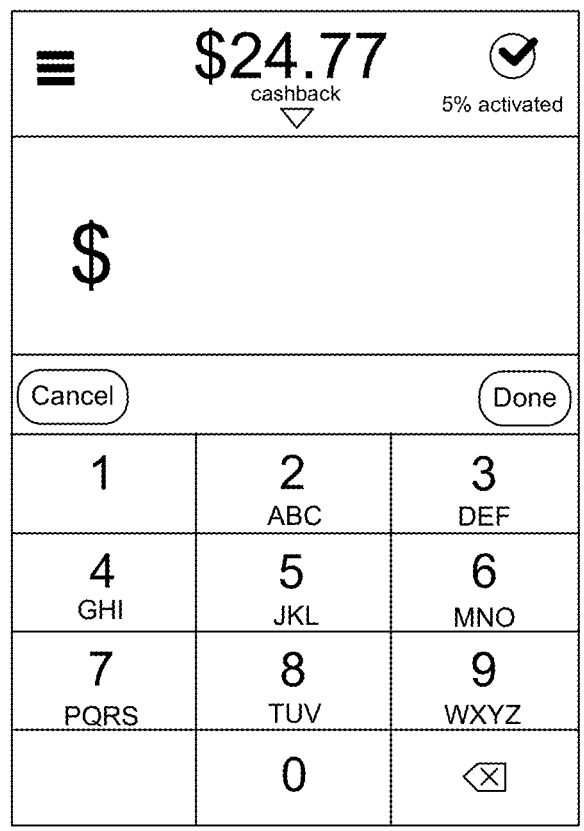

Once the account holder has been authenticated, the app presents the account holder with a screen allowing entry of the amount of the total purchase at the chosen merchant, as shown in FIG. 9. The account holder can enter this amount after the cashier at the POS has scanned all the items to be purchased, calculated the total amount, and communicated the total amount to the account holder. FIG. 10 shows a screen that may be presented on the account holder's mobile device 132 to enable the account holder to enter the total amount. The app may be configured, for example, to present the screen in FIG. 10 if the account holder taps the total purchase amount field 92 in FIG. 9. In alternative embodiments of the invention, the POS device 142 may be configured to transmit the total amount electronically to the account holder's mobile device 132, e.g., through a Bluetooth, WiFI, NFC, or other connection, which would eliminate the need for the account holder to enter the total amount manually.

Figure 11:
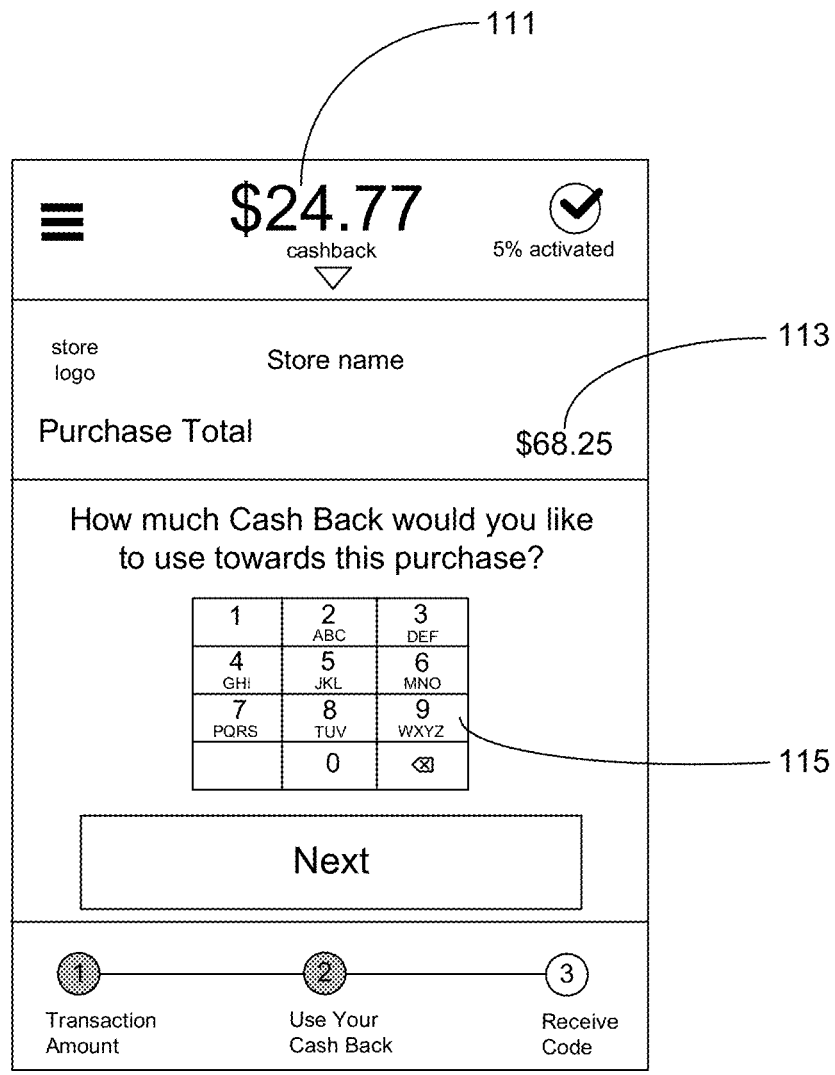
FIG. 11 is an example of a screen allowing an account holder to enter an amount of rewards currency to apply to a purchase.

Once the account holder has entered the total purchase amount, the app presents a screen, as shown in FIG. 11, that allows the account holder to specify how much rewards cash he or she would like to apply to the purchase. The screen in FIG. 11 also presents the amount of available rewards cash 111 and the total purchase amount 113. The screen in FIG. 11 asks the user how much rewards cash he or she would like to use and allows the user to enter the amount using the keypad 115 on the touch screen of the mobile device 132, according to one embodiment of the invention.

If the total purchase amount (in this example $68.25) is greater than the amount of rewards cash that the account holder has chosen to apply (in this example $24.77), then the app may present a message informing the account holder of that fact. The app may also ask the account holder if they would like to charge the difference to the account (e.g., CHASE FREEDOM credit card account) associated with the account. The app may present "Cancel" and "Confirm" buttons to allow the account holder to specify their choice as to whether to charge the difference or to cancel the transaction.

Figure 12:
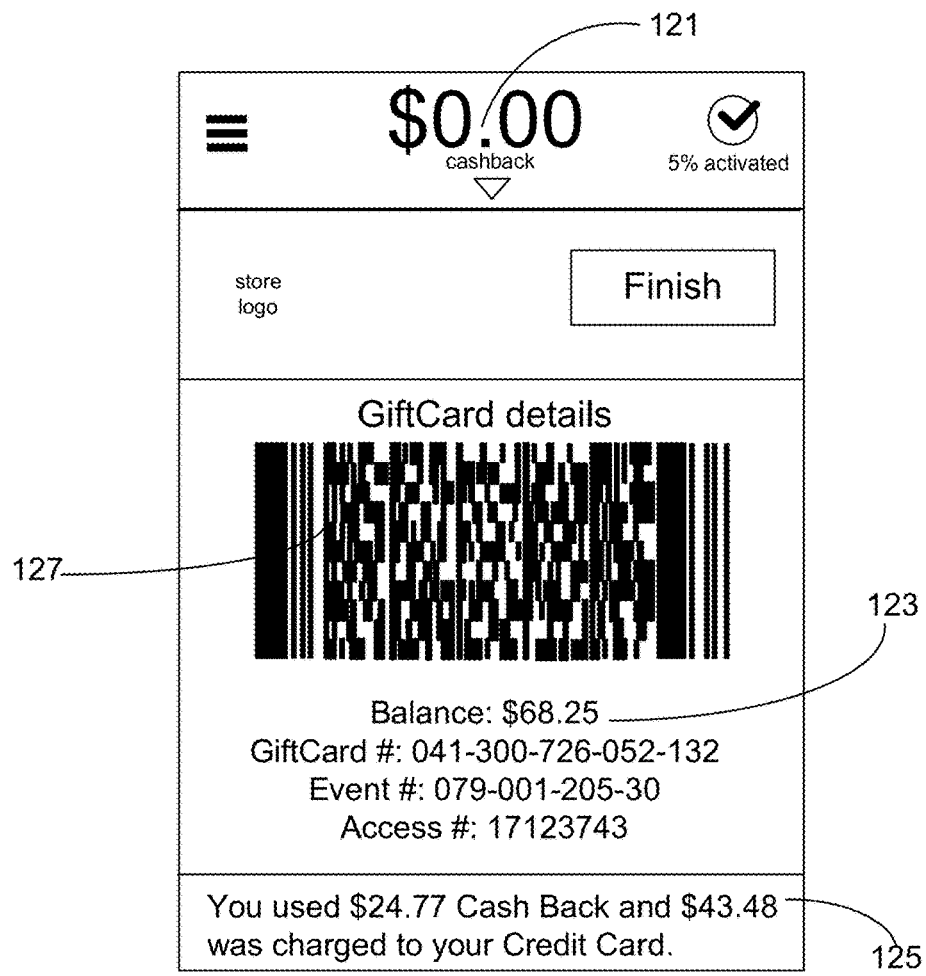
FIG. 12 is an example of a screen presenting an electronic gift card with a bar code that the account holder can use to make a purchase with his or her rewards currency at a point of sale device of a participating merchant.

After the account holder has entered the desired allocation for payment of the total purchase amount (e.g., using all rewards cash or a combination of rewards cash and credit card charge), the app generates an electronic gift card or other digital tender. An example of an electronic gift card is shown in FIG. 12. In this example, the account holder has used all of their available rewards cash ($24.77), and the available rewards cash amount 121 is updated accordingly ($0.00). The electronic gift card also displays the total amount 123 ($68.25) and informs the user of the amount 125 ($43.48) that has been charged to his or her credit card. The electronic gift card also includes a bar code 127 that the account holder can present to the merchant's POS device 142 to execute the payment.

Also show in the example of FIG. 12 are GiftCard number, an Event number, and an Access number. These and other reference numbers may be configured by the gift card provider or other payment processor operating the payment server 150, 160 to specify or define certain processes related to the transaction. For example, the GiftCard number may be displayed in case the bar code 127 cannot be read by the merchant's POS device 142. The Event number may be used in predefined circumstances, such as if a telephone transaction is necessary, and the Access Number may be used in other predefined channels as configured by the payment processing entity, financial institution, and/or the merchant.

According to other embodiments of the invention, the app may present the user with an option to indicate that he or she is "at the register" at a merchant, or alternatively that he or she "will be shopping later." For example, the app may present two buttons with these legends and allow the user to tap one to select the desired option. If the user selects the "I'm at the Register" option, then the transaction proceeds as descried above. If the user selects the "I'll be shopping later" button, then the user can execute the process described above but save the electronic gift certificate or other digital tender to his or her digital wallet on his or her mobile device, which can be stored as a section in the app. According to one embodiment the user's wallet section can be listed in a main menu of the app, and can appear as a different color when it contains active electronic gift cards that the user has not yet redeemed. In this way, the user can take care of generating the electronic gift card at an earlier time, and then easily retrieve the electronic gift card when he or she is actually ready to use it.

Referring again to FIG. 1, the system is preferably configured to make the process for using rewards cash for payment very easy for the account holder. According to one embodiment of the invention, an electronic gift card server 150 or other payment server 160 is used to facilitate the process. In this embodiment, each of the participating merchants enters into an agreement with the electronic gift card provider or other payment processing entity to configure their POS devices 142 to read the electronic gift cards or other digital tenders and to accept the electronic gift cards or other digital tender for payment. Once the user 130 has used the electronic gift card or other digital tender to make a purchase, the participating merchant 140 can settle with the electronic gift card provider or other payment processing entity. For example, the merchant 140 may send a batch file containing information on all of the electronic gift card or other electronic transactions during a specified period for payment by the electronic gift card provider or other payment processor to the merchant.

As one example, when a retail bank calls a gift card provider's application programming interface (API) for gift card, the gift card provider delivers a gift card that is unique and readable by merchant processor. When scanned or keyed in at the merchant's POS device 142, the merchant's processor acknowledges it as tender for payment. The gift card provider will bill the retail bank for the negotiated value of the electronic gift card. The gift card provider will then pay the merchant the negotiated rate of the electronic gift card. One advantage of exemplary embodiments of the invention is that it is not limited to a particular digital tender format (e.g., electronic gift cards) or to a particular payment network (e.g., VISA). Various digital tenders and networks can be used to carry out the processes described herein According to one embodiment, the electronic gift card provider or other payment processing entity may be a company that is independent from the financial institution 120 and that generates electronic gift cards or other digital tenders for the account holders 130 on behalf of the financial institution 120 as described above. An example of a gift card provider is BlackHawk Network, Inc. The electronic gift card provider or other payment processing entity and the financial institution may enter into an agreement whereby the financial institution 120 is able to link into the gift card provider's/payment processor's system 150/160, e.g., by an application programming interface (API), such that the financial institution can initiate the real time generation of an electronic gift card by the gift card server 150 or other digital tender by the payment server 160, and transmission to the account holder 130 of the financial institution 120.

According to another embodiment of the invention, the electronic gift card provider or other payment processing entity may be a division or system within the financial institution 120. In this embodiment, the electronic gift card division would perform a substantially similar function and operate the gift card server 150 or payment server 160. For example, a retail bank may create an electronic tender that can be utilized at the merchant POS device 142. The app on the user's mobile device 132 would call that tender in place of the gift cards to facilitate payment. The retail bank may operate a payment platform that allows for tender to be generated digitally on a user's mobile device 132. The app would use that tender at the POS 142.

According to another embodiment of the invention, the financial institution 120 may send the user a message notifying the user that his or her rewards currency has been used in a transaction immediately or shortly after the transaction. This feature can provide the advantage of reinforcing to the user the benefits of the rewards program offered by the financial institution 120 by showing the user how much he or she just saved because of the rewards program.

As part of the settlement process, the financial institution 120 may also send the account holder a statement showing use of rewards currency in each transaction according to an exemplary embodiment of the invention. For example, the financial institution 120 may send a monthly statement to a card holder indicating that the card holder made a purchase at Target for a total of $68.25 on a certain date using $24.77 in rewards cash value with $43.48 being added to the outstanding credit balance.

One advantage that various embodiments of the invention can provide is the ability to allow the account holder to easily complete a payment transaction using their rewards currency on their mobile device, with or without an additional account adjustment, (e.g., increase in credit card balance, or decrease in debit card balance). The system, according to one embodiment, uses an electronic gift card or other digital signal or tender generated in real time to make the full payment to the participating merchant and accounts for the use of rewards currency when calculating the account holder's account balance.

Another advantage that can be provided by various embodiments of the invention is that the financial institution 120 may realize a revenue stream if it obtains a discount on purchasing the electronic gift cards or other digital tender. For example, the financial institution may enter into an agreement with a third party gift card provider whereby the financial institution pays $95 for a $100 electronic gift card transmitted to the account holder.

Another advantage that can be provided by various embodiments of the invention is increased loyalty due to the increased satisfaction of the account holders. The system not only can make it very easy for the account holder to see the amount of his or her available rewards currency, but also proactively informs the account holder of opportunities to use it, and makes the payment process very simple. Consequently, the account holder may have a very positive experience of getting a discount when they did not expect it. This type of experience may enhance loyalty to the financial institution much more than a convention rewards program that may take significantly more effort to understand and redeem the rewards currency.

Although the foregoing description has focused primarily on electronic gift cards as the digital tender, the system may utilize other digital tender outside of electronic gift cards. For example, a retail bank or payment processor may create its own form of digital tender that can be accepted at the merchant POS device 142.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 100 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although an example of a user communication device 132 is shown in FIG. 1, exemplary embodiments of the invention may utilize other types of communication devices whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The user mobile device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The user communication device may also include a network-enabled appliance, a browser-equipped or other network-enabled mobile phone, a smart phone, or another TCP/IP client or other device. The mobile device 132 may include various connections such as a cell phone connection, WiFi connection, Bluetooth connection, and/or near field communication (NFC) connection, for example.

As described above, FIG. 1 includes a number of servers 122, 124, 126, 144, and 150 and user communication devices 132, 134 each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 132. As used herein, a user interface may include any hardware, software, or combination of hardware and software used by the processor that allows a user to interact with the processor of the communication device. A user interface may be in the form of a dialogue screen for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A computer-implemented method comprising:
   tracking, by a computer application executed on a mobile electronic device, location information associated with the mobile electronic device of an account holder;
   in response to tracking the location information, identifying, by the computer application executed by the mobile electronic device, one or more nearby merchants at which the account holder can make a payment using the mobile electronic device using a rewards currency associated with an account of the account holder;
   displaying, by the computer application executed by the mobile electronic device, the one or more nearby merchants;
   receiving, by the computer application executed by the mobile electronic device, an authentication of the account holder prior to initiating a transaction;
   displaying, by the computer application executed by the mobile electronic device, an available rewards currency amount that can be applied to a purchase on the mobile electronic device;
   receiving, by the computer application executed by the mobile electronic device, a total purchase amount for a purchase at a merchant;
   receiving, by the computer application executed by the mobile electronic device, a selected rewards currency amount that the account holder elects to apply to the purchase;
   receiving, by the computer application executed by the mobile electronic device, a confirmation from the account holder to use the account of the account holder to pay for a difference between the total purchase amount and the selected rewards currency amount when the total purchase amount is greater than the selected rewards currency amount;
   requesting, by the computer application, an electronic payment signal for the merchant for the selected rewards currency amount from a payment server;
   receiving, by the computer application executed by the mobile electronic device, the electronic payment signal from the payment server;
   generating, by the computer application executed by the mobile electronic device, a digital tender comprising at least one of a bar code, a quick response (QR) code, an NFC signal or a Bluetooth signal in response to the receipt of the electronic payment signal; and
   transmitting, by the computer application executed by the mobile electronic device, the digital tender to the merchant's point of sale device.

2. The method of claim 1, wherein:
   the digital tender represents an amount of value that is redeemable by the merchant at a payment processing entity.

3. The method of claim 2, wherein the payment processing entity is a third party provider of electronic payment services.

4. The method of claim 2, wherein the payment processing entity is an affiliate or a division of a bank that issues a credit card account to the account holder.

5. The method of claim 1, wherein the account of the account holder is a credit card account issued by a bank.

6. The method of claim 1, further comprising sending an electronic notification to the mobile electronic device after the purchase to notify the account holder that the selected rewards currency amount has been applied to the purchase.

7. The method of claim 2, wherein the redemption of the amount of value by the merchant at the payment processing entity is not conducted through a credit card network.

8. The method of claim 1, further comprising the computer application displaying on the display of the mobile electronic device, before the account holder initiates a transaction at one of the nearby merchants, a plurality of categories of merchants at which the account holder is able to make a payment with the mobile electronic device using the rewards currency associated with the account of the account holder.

9. The method of claim 1, further comprising:
   the computer application inquiring whether the account holder is at the point of sale device or whether the account holder will be shopping later; and
   when the account holder indicates that he or she will be shopping later, the computer application causing an electronic gift certificate to be saved in an electronic wallet stored on the mobile electronic device.

10. A mobile electronic device comprising:
a display;
a memory;
at least one computer processor; and
a computer application executed by the at least one computer processor;
wherein:
  the computer application tracks location information associated with the mobile electronic device of an account holder;
  in response to tracking the location information, the computer application identifies one or more nearby merchants at which the account holder can make a payment using the mobile electronic device using a rewards currency associated with an account of the account holder;
  the computer application causes an identification of the one or more nearby merchants to be displayed on the display;
  the computer application receives an authentication of the account holder prior to initiating a transaction;
  the computer application causes an available rewards currency amount that can be applied to a purchase to be displayed on the display;
  the computer application receives a total purchase amount for a purchase at a merchant;
  the computer application receives a selected rewards currency amount the account holder elects to apply to the purchase;
  the computer application receives a confirmation from the account holder to use the account of the account holder to pay for a difference between the total purchase amount and the selected rewards currency amount when the total purchase amount is greater than the selected rewards currency amount;
  the computer application requests an electronic payment signal for the merchant for the selected rewards currency amount from a payment server;
  the computer application receives the electronic payment signal from the payment server;
  the computer application generates a digital tender comprising at least one of a bar code, a quick response (QR) code, an NFC signal or a Bluetooth signal in response to the receipt of the electronic payment signal; and
  the computer application transmits the digital tender to the merchant's point of sale device.

11. The device of claim 10, wherein:
the digital tender represents an amount of value that is redeemable by the merchant at a payment processing entity.

12. The device of claim 11, wherein the payment processing entity is a third party provider of electronic payment services.

13. The device of claim 11, wherein the payment processing entity is an affiliate or a division of a bank that issues a credit card account to the account holder.

14. The device of claim 10, wherein the account of the account holder is a credit card account issued by a bank.

15. The device of claim 10, wherein the computer application sends an electronic notification to the mobile electronic device after the purchase to notify the account holder that the selected rewards currency amount has been applied to the purchase.

16. The device of claim 11, wherein the redemption of the amount of value by the merchant at the payment processing entity is not conducted through a credit card network.

17. The device of claim 10, wherein before the account holder initiates a transaction at one of the nearby merchants, the computer application causes a plurality of categories of merchants at which the account holder is able to make a payment with the mobile electronic device using the rewards currency associated with the account of the account holder to be displayed on the display.

18. The device of claim 10, wherein the computer application inquires whether the account holder is at the point of sale device or whether the account holder will be shopping later;
  the computer application receives an indication from the account holder that he or she will be shopping later; and
  the computer application causes an electronic gift certificate to be saved in an electronic wallet stored on the mobile electronic device.

* * * * *